Feb. 24, 1959 — M. T. TOWNSEND — 2,874,843
MILK STRAINING DEVICE
Filed June 16, 1954
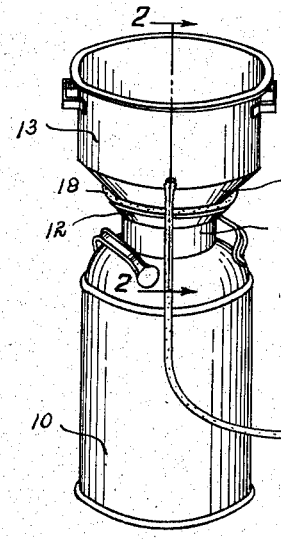
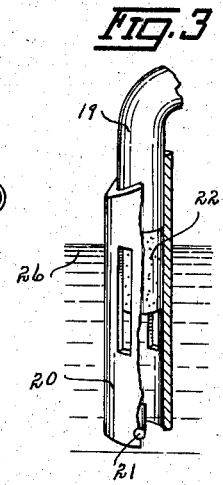
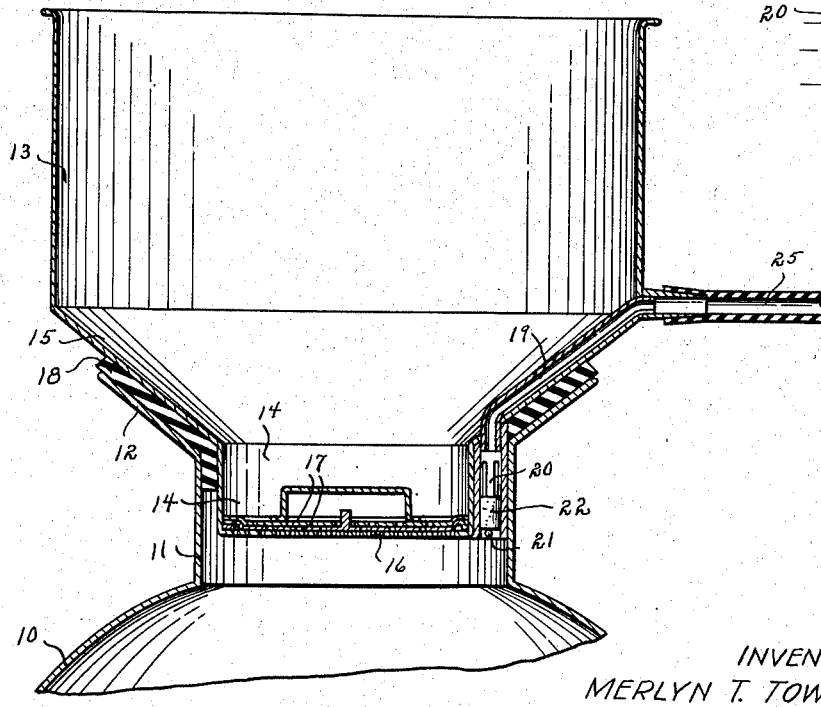
INVENTOR.
MERLYN T. TOWNSEND
BY Talbert Dick & Adler
ATTORNEYS.

United States Patent Office 2,874,843
Patented Feb. 24, 1959

2,874,843
MILK STRAINING DEVICE
Merlyn T. Townsend, Stacyville, Iowa
Application June 16, 1954, Serial No. 437,162
1 Claim. (Cl. 210—120)

This invention relates to milk straining equipment.
The usual method of straining milk is to pour the milk from a container to another with a straining element imposed between the two containers. Often the receiving container is a milk can having a strainer over its top. Obviously as the milk enters the milk can, it replaces air in the can and this air must escape from the can to permit the entrance of the milk. If the air is forced to pass upwardly through the strainer and in a direction opposite from the milk flow, the entrance of the milk will be retarded and the straining process will be slow and tedious. Some efforts have been made to suck air from the receiving container, thereby producing a partial vacuum below the strainer and thus speed the straining of the milk. Such devices usually pass through the seal gasket between the two containers, interfere with the sealing, are complicated, and not easily manipulated nor cleaned. Furthermore, they do not automatically shut off the suction action when the receiving container becomes full of strained milk.

Therefore, the principal object of my invention is to provide a milk strainer that has a suction producing means on the upper detachable container or funnel portion and free of the gasket seal between the upper and lower containers.

A further object is to provide a vacuum milk straining device that will automatically shut off the suction means when the receiving container or can becomes full of strained milk.

Still further objects of this invention are to provide a rapid milk strainer that is economical in manufacture, and durable in use.

These and other objects will be apparent to those skilled in the art.

My invention consists in the construction, arrangement, and combination of the various parts of the device, whereby the objects contemplated are attained as hereinafter more fully set forth, specifically pointed out in my claim, and illustrated in the accompanying drawings, in which:

Fig. 1 is a perspective view of my device ready for use,

Fig. 2 is an enlarged longitudinal sectional view of the upper portion of my device and is taken on line 2—2 of Fig. 1, and Fig. 3 is an enlarged perspective view of the automotive shut-off valve means.

In these drawings I have used the numeral 10 to designate the lower container for receiving the strained milk. This container is in the form of an ordinary milk can having a neck portion 11 and an upwardly and outwardly extending top rim flange 12. The numeral 13 designates the upper container or funnel portion having an open top, a diameter reduced bottom head portion 14, and a bottom wall 15 that extends upwardly and outwardly from the portion 14 to the walls of the upper portion, as shown in Fig. 2. The bottom head portion 14 is of a diameter to loosely extend into the neck 11 of the milk can, and the flared portion 15 is adapted to conform to and detachably rest on the milk can portion 12. The design of this upper filter container 13 is similar to that of the present ones used. After being placed on the milk can, the milk is poured into this container funnel 13 and permitted to drain through strainers into the lower milk can. The bottom of the head portion 14 is of grid or like perforated construction designated by the numeral 16. Resting on top of this portion 16 are the usual strainer discs 17. The numeral 18 designates a rubber or like seal gasket between the portion 12 and the portion 15 to hermetically seal the space between these two portions. Up to this point, the parts described in detail are substantially of standard items already in use, and it is to such that I apply my invention and which I will now describe in detail. The numeral 19 designates a conduit extending through the side wall of the container 13, thence downwardly and inwardly on the inner side of the portion 15, thence through the lower area of the portion 15 and thence vertically to the outside of the head portion 14. The numeral 20 designates a vertical slotted cage secured at its upper end around the lower end of the pipe 19 as shown in Fig. 3. This cage rests at the side of the head portion 14 and when the head portion 14 is within the neck 11, it rests between the outer side of the head 14 and the inner side of the neck 11, as shown in Fig. 1. Extending transversely through the bottom end of the slitted cage 20 is a cork retaining pin 21. Slidably within the cage 20 is the cork or like valve element 22, normally resting in the lower part of the cage, but capable of sliding upwardly to contact the entrance end of the pipe 19 and close the same. The numeral 23 designates any type of suction fan having a prime mover 24. The numeral 25 designates a flexible hose connected at one end to the upper end of the pipe conduit 19 and its other end to the inlet area of the suction fan 23. By this arrangement when the motor 24 is running air it will be drawn from the inside of the container 10, through the slot openings of the cage 20. This will not only withdraw air being replaced by the milk moving into the can 10, but will keep the escaping air from passing through the strainers and milk being strained. Also a partial vacuum will exist within the can 10, thereby sucking and urging milk to pass rapidly through the strainers at an accelerated rate greater than merely by the force of gravity. When the milk in the can 10 rises to a height to affect the cork or like valve 22, the same will be lifted thereby until it engages the entrance end of the pipe 19, thereby closing the pipe 19 and automatically stopping the withdrawal of further air from the can. Thus, when the milk 26 fills the can 10, my suction means will be automatically shut off.

By the pipe 19 passing into the container 13, in the area of the gasket 18, the gasket is not affected in its sealing mission between the upper and lower containers. Also when the container funnel 13 is lifted from the can 10, the entire suction phase is removed as a unit with the funnel container. This makes possible the rapid use of my device with and onto a plurality of strained milk receiving cans 10.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my milk straining device without departing from the real spirit and purpose of my invention, and it is my intention to cover by my claim, any modi-

I claim:

In a device of the class described, a filter container having a flared bottom portion adapted to detachably rest on a flared rim portion of a receiving container and terminating in a bottom filter portion adapted to detachably rest on a flared rim portion of a receiving container and terminating in a bottom filter portion adapted to extend into the neck of said receiving container in spaced relationship, a gasket on the bottom of said flared portion of said filter container and continuing downwardly outside said bottom filter portion, a conduit extending on the inner side of the flared portion of said filter container and then extending downwardly at the side of said bottom filter portion to terminate in a horizontal plane near the bottom of said bottom filter portion, a strainer means in the bottom of the bottom filter portion of said filter container, an air suction means operatively connected to said conduit, and a float shut off valve means on that end of said conduit to cut off said air suction means when its float is actuated by a liquid rising to the area of said float shut off valve means.

References Cited in the file of this patent
UNITED STATES PATENTS

| | | |
|---|---|---|
| 102,974 | Ruf | May 10, 1870 |
| 201,472 | Williams | Mar. 19, 1878 |
| 953,065 | Smith | Mar. 29, 1910 |
| 1,115,505 | Chapin | Nov. 3, 1914 |
| 1,341,119 | Fraser | May 25, 1920 |
| 1,681,980 | Gross | Aug. 28, 1928 |
| 1,820,334 | Wiesman | Aug. 25, 1931 |
| 1,820,610 | Eves | Aug. 25, 1931 |
| 2,126,625 | Eggleston | Aug. 9, 1938 |
| 2,450,510 | Hanson | Oct. 5, 1948 |
| 2,465,623 | Zika | Mar. 29, 1949 |
| 2,649,966 | Johnston | Aug. 25, 1953 |